United States Patent
Lotfallah et al.

(10) Patent No.: US 9,854,009 B2
(45) Date of Patent: *Dec. 26, 2017

(54) METHOD AND APPARATUS FOR ENABLING MULTIMEDIA SYNCHRONIZATION

(71) Applicant: InterDigital Patent Holdings, Inc., Wilmington, DE (US)

(72) Inventors: Osama Lotfallah, San Diego, CA (US); Hang Liu, North Potomac, MD (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/152,388

(22) Filed: May 11, 2016

(65) Prior Publication Data
US 2016/0255125 A1 Sep. 1, 2016

Related U.S. Application Data

(63) Continuation of application No. 14/739,940, filed on Jun. 15, 2015, now Pat. No. 9,369,502, which is a
(Continued)

(51) Int. Cl.
*H04L 29/06* (2006.01)
*H04L 29/08* (2006.01)

(52) U.S. Cl.
CPC .... *H04L 65/1083* (2013.01); *H04L 29/06197* (2013.01); *H04L 29/06217* (2013.01);
(Continued)

(58) Field of Classification Search
CPC ............. H04L 65/1006; H04L 65/1016; H04L 65/1083; H04L 65/1093; H04L 65/80;
(Continued)

(56) References Cited

U.S. PATENT DOCUMENTS

2010/0107205 A1 4/2010 Foti
2011/0310824 A1 12/2011 Perras
(Continued)

FOREIGN PATENT DOCUMENTS

EP 2178300 A1 4/2010
WO 2011108983 A1 9/2011

OTHER PUBLICATIONS

3GPP, Technical Specification Group Services and System end-to-end Packet-switched Streaming Service (PSS); Progressive Download and Dynamic Adaptive Streaming over HTTP (3GPP-DASH) (Release 10) (3GPP TS 26.247 V10.0.0 (Jun. 2011).
(Continued)

*Primary Examiner* — Ayaz Sheikh
*Assistant Examiner* — Debebe Asefa
(74) *Attorney, Agent, or Firm* — Invention Mine LLC

(57) ABSTRACT

Methods and apparatus are described for synchronizing a media presentation on a plurality of wireless transmit/receive units (WTRUs). A media session may be synchronized by a first wireless transmit/receive unit (WTRU) creating a networked bookmark for a media program at a bookmark-created time; the first WTRU presenting the media program at a bookmark-presentation time, wherein the first WTRU includes in the networked bookmark a suggested presentation offset that indicates an offset in time from the bookmark-created time to the bookmark-presentation time; and the first WTRU transmitting the networked bookmark, including the suggested presentation offset, to an Internet Protocol (IP) Multimedia Subsystem (IMS) network for use by a second WTRU in replicating, at the second WTRU, the presentation of the media program at the first WTRU.

20 Claims, 16 Drawing Sheets

Related U.S. Application Data continuation of application No. 13/633,532, filed on Oct. 2, 2012, now Pat. No. 9,088,583.

(60) Provisional application No. 61/553,816, filed on Oct. 31, 2011.

(52) U.S. Cl.
CPC .. *H04L 29/06353* (2013.01); *H04L 29/06374* (2013.01); *H04L 29/06523* (2013.01); *H04L 65/1006* (2013.01); *H04L 65/1016* (2013.01); *H04L 65/1093* (2013.01); *H04L 65/80* (2013.01); *H04L 67/04* (2013.01); *H04L 67/10* (2013.01)

(58) Field of Classification Search
CPC ......... H04L 29/06197; H04L 29/06217; H04L 29/06353; H04L 29/06374; H04L 29/06523

See application file for complete search history.

(56) References Cited

U.S. PATENT DOCUMENTS

| | | | |
|---|---|---|---|
| 2012/0093062 A1 | 4/2012 | Perras | |
| 2012/0093063 A1* | 4/2012 | Yuan | H04L 5/0053 370/315 |
| 2012/0236842 A1* | 9/2012 | De Foy | H04L 65/1016 370/350 |

OTHER PUBLICATIONS

3GPP Technical Specification Group services and System end-to-end Packet-Switched Streaming Service (PSS); Progressive Download and Dynamic Adaptive Streaming over HTTP (3GPP-Dash) Release 11) (3GPP TS 26.247 V11.0.0(Jun. 2012).

3GPP; Technical Specification Group Services and System Aspects; IP Multimedia Subsystem (IMS) based Packet Switch Streaming (PSS) and Multimedia Broadcast/Multicast Service (MBMS) User Service; Protocols (Release 9) (3GPP TS 26.237 V9.3.0 (Jun. 2010)).

3GPP; Technical Specification Group Services and System Aspects; IP Multimedia Subsystem (IMS) based Packet Switch Streaming (PSS) and Multimedia Broad cast/Multicast Service (MBMS) User Service; Protocols (Release 11) (3GPP TS 26.237 V11.0.0 (Jun. 2012).

3GPP Change Request—3GPP TSG-SA4 Meeting #69-Erlangen, Germany, May 21-25, 2012; S4-120835 revision of S4-120779; Author/Source: Interdigital Communications.

Boronat et al, "Multimedia group and inter-stream synchronization techniques: A comparative study", Elsevier Information Systems 34 pp. 108-131 (2009).

Brandenburg et al., "RTCP for inter-destination media synchronization draft-brandenburg-avt-rtcp-for-idms-04.txt," Audio/Video Transport Working Group, Internet Draft (Mar. 4, 2011).

European Telecommunications Standards Institute, "Telecommunications and Internet converged Services and Protocols for Advanced Networking (TISPAN); IMS-based IPTV stage 3 specification," ETSI TS 183 063 V3.5.2 (Mar. 2011).

Firestone et al., "Lip Synchronization in Video Conferencing," Chapter 7: Voice and Video Conferencing Fundamentals, Cisco Press, ISBN-10:1-58705-268-7 (Mar. 16, 2007).

International Telecommunication Union, G.1010, Series G: Transmission Systems and Media, Digital Systems and Networks; Quality of service and performance; End-user multimedia QoS categories (Nov. 2001).

Perkins et al., "Rapid Synchronisation of RTP Flows," Internet Engineering Task Force (IETF), Request for Comments: 6051 (Nov. 2010).

Third Generation Partnership Project, "Technical Specification Group Services and System Aspects; IP Multimedia Subsystem (IMS) based Packet Switch Streaming (PSS) and Multimedia Broadcast/Multicast Service (MBMS) User Service; Protocols (Release 8)," 3GPP TS 26.237 V8.6.0 (Sep. 2011).

Third Generation Partnership Project, "Technical Specification Group Services and System Aspects; IP Multimedia Subsystem (IMS) Based Packet Switch Streaming (PSS) and Multimedia Broadcast/Multicast Service (MBMS) User Service; Protocols (Release 8)," 3GPP TS 26.237 v8.7.0, Nov. 2011.

Third Generation Partnership Project, "Technical Specification Group Services and System Aspects; IP Multimedia Subsystem (IMS) based Packet Switch Streaming (PSS) and Multimedia Broadcast/Multicast Service (MBMS) User Service; Protocols (Release 9)," 3GPP TS 26.237 V9.7.0 (Sep. 2011).

Third Generation Partnership Project, "Technical Specification Group Services and System Aspects; IP Multimedia Subsystem (IMS) Based Packet Switch Streaming (PSS) and Multimedia Broadcast/Multicast Service (MBMS) User Service; Protocols (Release 9)," 3GPP TS 26.237 v9.8.0, Nov. 2011.

Third Generation Partnership Project, "Technical Specification Group Services and System Aspects; IP Multimedia Subsystem (IMS) based Packet Switch Streaming (PSS) and Multimedia Broadcast/Multicast Service (MBMS) User Service; Protocols (Release 10)," 3GPP TS 26.237 V10.3.0 (Sep. 2011).

Third Generation Partnership Project, "Technical Specification Group Services and System Aspects; IP Multimedia Subsystem (IMS) based Packet Switch Streaming (PSS) and Multimedia Broadcast/Multicast Service (MBMS) User Service; Protocols (Release 10)," 3GPP TS 26.237 V10.5.0 (Jun. 2012).

Third Generation Partnership Project, "Technical Specification Group Services and System Aspects; IP Multimedia Subsystem (IMS) based Packet Switch Streaming (PSS) and Multimedia Broadcast/Multicast Service (MBMS) User Service; Protocols (Release 11)," 3GPP TS 26.237 V11.0.0 (Jun. 2012).

Third Generation Partnership Project, 'Technical Specification Group Services and System Aspects; Transparent End-to-End Packet-Switched Streaming Service (PSS); Progressive Download and Dynamic Adaptive Streaming Over HTTP (3GP-DASH) (Release 10),' 3GPP TS 26.247 v1.1.0, Nov. 2010.

Third Generation Partnership Project, "Technical Specification Group Services and System Aspects; Transparent end-to-end Packet-switched Streaming Service (PSS); Progressive Download and Dynamic Adaptive Streaming over HTTP (3GP-DASH) (Release 10)," 3GPP TS 26.247 V10.2.0 (Jun. 2012).

Third Generation Partnership Project, "Technical Specification Group Services and System Aspects; Transparent end-to-end Packet-switched Streaming Service (PSS); Progressive Download and Dynamic Adaptive Streaming over HTTP (3GP-DASH) (Release 11)," 3GPP TS 26.247 V11.0.0 (Sep. 2012).

Brandenburg et al., "RTCP for inter-destination media synchronization draft-ietf-avtcore-idms-01.txt," AVTCore Internet Draft, draft-ietf-avtcore-idms-01.txt (Jul. 6, 2011).

Notification of Transmittal of the International Preliminary Report on Patentability for PCT/US2012/058972 dated Jan. 17, 2014, 13 pages.

Written Opinion of the International Preliminary Examining Authority for PCT/US2012/058972 dated Nov. 14, 2013, 6 pages.

Notification of Transmittal of the International Search Report and the Written Opinion of the International Searching Authority, or the Declaration for PCT/US2012/058972 dated May 21, 2013, 16 pages.

Invitation to pay additional fees, and where applicable, protest fee for PCT/US2012/058972 dated Feb. 4, 2013, 7 pages.

\* cited by examiner

```xml
<?xml version='1.0' encoding='UTF-8'?>
<xs:schema xmlns:xs='http://www.w3.org/2001/XMLSchema'
xmlns:r11='urn:3gpp:bookmark:2012:IMS-PSS-MBMS'
xmlns:sv='urn:3gpp:bookmark:2012:IMS-PSS-MBMS:schemaVersion'
elementFormDefault='qualified' attributeFormDefault='unqualified'
targetNamespace='urn:3gpp:bookmark:2009:IMS-PSS-MBMS'
xmlns:tns='urn:3gpp:bookmark:2009:IMS-PSS-MBMS' version='2'>

<xs:annotation>
      <xs:appinfo>nBookmark version 2</xs:appinfo>
      <xs:documentation xml:lang='en'>
            This schema contains the Rel 11 extension to the nBookmark schema.
        </xs:documentation>
    </xs:annotation>

<xs:import schemaLocation='3gpp-bookmark-2012.xsd'
namespace='urn:3gpp:bookmark:2012:IMS-PSS-MBMS'/>
<xs:import schemaLocation='schema-version.xsd'
namespace='urn:3gpp:bookmark:2012:IMS-PSS-MBMS:schemaVersion'/>

<xs:element name='BookmarkList'>
        <xs:complexType>
            <xs:sequence>
                <xs:element name='Bookmark' type='tns:BookmarkType' minOccurs='0' maxOccurs='unbounded'/>
                <xs:element ref='sv:schemaVersion'/>
                <xs:any namespace='##other' processContents='lax' minOccurs='0' maxOccurs='unbounded'/>
            </xs:sequence>
                <xs:anyAttribute processContents='skip'/>
        </xs:complexType>
```

FIG. 16A

```
        </xs:complexType>
    </xs:element>
    <xs:complexType name="BookmarkType">
        <xs:sequence>
            <xs:element name="Creator" type="xs:anyURI"/>
            <xs:element name="Created" type="xs:dateTime"/>
            <xs:element name="ProgramId" type="xs:anyURI"/>
            <xs:element name="ProgramType" type="xs:string"/>
            <xs:element name="Offset" type="xs:duration" minOccurs="0"/>
            <xs:element name="Tag" type="xs:string" minOccurs="0"/>
            <xs:element name="Rank" type="xs:string" minOccurs="0"/>
            <xs:element name="Comment" type="xs:string" minOccurs="0"/>
            <xs:element name="Expires" type="xs:dateTime" minOccurs="0"/>
            <xs:element name="Sharing" type="xs:boolean"/>
            <xs:element name="RetrievalCount" type="xs:nonNegativeInteger" minOccurs="0"/>
            <xs:element name="RetrievalTime" type="xs:dateTime" minOccurs="0" maxOccurs="unbounded"/>
                <xs:element ref="r11:bookmark2012" minOccurs="0" maxOccurs="unbounded"/>
                <xs:element ref="sv:delimiter"/>
                <xs:any namespace="##other" processContents="lax" minOccurs="0" maxOccurs="unbounded"/>
        </xs:sequence>
        <xs:attribute name="id" type="xs:anyURI" use="required"/>
        <xs:anyAttribute processContents="skip"/>
    </xs:complexType>
</xs:schema>
```

FIG. 16B

```
<?xml version="1.0" encoding="UTF-8"?>
<xs:schema targetNamespace="urn:3gpp:bookmark:2012:IMS-PSS-MBMS"
    attributeFormDefault="unqualified" elementFormDefault="qualified"
    xmlns:xs="http://www.w3.org/2001/XMLSchema"
    xmlns="urn:3gpp:bookmark:2012:IMS-PSS-MBMS">

<xs:annotation>
    <xs:appinfo>nBookmark2012</xs:appinfo>
    <xs:documentation xml:lang="en">
        This schema is the Rel 11 extension to the nbookmark schema.
        </xs:documentation>
    </xs:annotation>

</xs:element name="bookmark2012">
            <xs:complexType>
                    <xs:sequence>
                            <xs:element name="suggestedPresentationOffset: type="xs:duration"
minOccurs="0" maxOccurs="unbounded:/>
                    </xs:sequence>
            </xs:complexType>
        </xs:element>

</xs:schema>
```

FIG. 17

```
<?xml version="1.0" encoding="UTF-8"?>
<xs:schema xmlns="urn:3gpp:bookmark:2012:IMS-PSS-MBMS:schemaVersion"
            xmlns:xs="http://www.w3.org/2001/XMLSchema"
            targetNamespace="urn:3gpp:bookmark:2012:IMS-PSS-MBMS:schemaVersion"
            elementFormDefault="qualified">

<xs:element name="schemaVersion" type="xs:unsignedInt"/>
    <xs:element name="delimiter" type="xs:byte"/>

</xs:schema>
```

METHOD AND APPARATUS FOR ENABLING MULTIMEDIA SYNCHRONIZATION

CROSS REFERENCE TO RELATED APPLICATIONS

This application is a continuation of U.S. patent application Ser. No. 14/739,940, filed Jun. 15, 2015, which is a continuation of U.S. patent application Ser. No. 13/633,532, filed Oct. 2, 2012 and issued Jul. 21, 2015 as U.S. Pat. No. 9,088,583, which claims the benefit of U.S. Provisional Application No. 61/553,816, filed Oct. 31, 2011, all of which are incorporated by reference as if fully set forth.

BACKGROUND

The quality of multimedia streaming may be affected by several factors. One of them, for example, is the one-way delay of receiving the multimedia streams, whereby the delay for conversational audio/video applications and interactive applications may be less than 1 second, while the delay for non-interactive audio/video streaming applications may be less than 10 seconds.

Another example of a factor that affects the quality of multimedia streaming may be the synchronized presentation of multimedia streams. A human visual system may be tolerant to a small degree of skew in presenting audio and video streams, (e.g., less than 80 mseconds). Transporting audio and video streams over unreliable networks, such as wireless and the Internet, may introduce a variable delay in receiving audio and video packets. This delay variation may become significant if audio and video packets are sent over two different connections, as is the case for real-time transport protocol (RTP)/RTP control protocol (RTCP) streaming.

Lip synchronization may affect applications such as television (TV) video games and video conferencing applications. This may become a complex process if dealing with a multimedia presentation at two or more geographically distributed locations in a temporally synchronized manner, which is applicable to social multimedia streaming, (i.e., multi-device synchronization).

SUMMARY

Methods and apparatus are described for synchronizing a media presentation on a plurality of wireless transmit/receive units (WTRUs). A media session may be replicated from a first WTRU onto a second WTRU. The first WTRU may initiate a bookmark procedure to create a bookmark to obtain synchronized playout with the second WTRU. A suggested presentation offset in the bookmark may specify an offset in time from a bookmark created time to a bookmark presentation time at the first WTRU. The first WTRU may establish an Internet protocol (IP) multimedia subsystem (IMS) session with a packet switch stream (PSS) server. The media session may be replicated onto the second WTRU at a wall-clock time T, and the second WTRU may present an offset equal to T−bookmarkcreatedtime+bookmark offset−suggestedPresentationOffset from the beginning of a program in order to obtain synchronized media playout with the first WTRU.

BRIEF DESCRIPTION OF THE DRAWINGS

A more detailed understanding may be had from the following description, given by way of example in conjunction with the accompanying drawings wherein:

FIGS. 16A and 16B show a modified extensible markup language (XML) schema for a networked bookmark;

FIG. 17 shows an extended XML schema for an nBookmark; and

FIG. 18 shows a schemaVersion element.

DETAILED DESCRIPTION

Figure 1A:
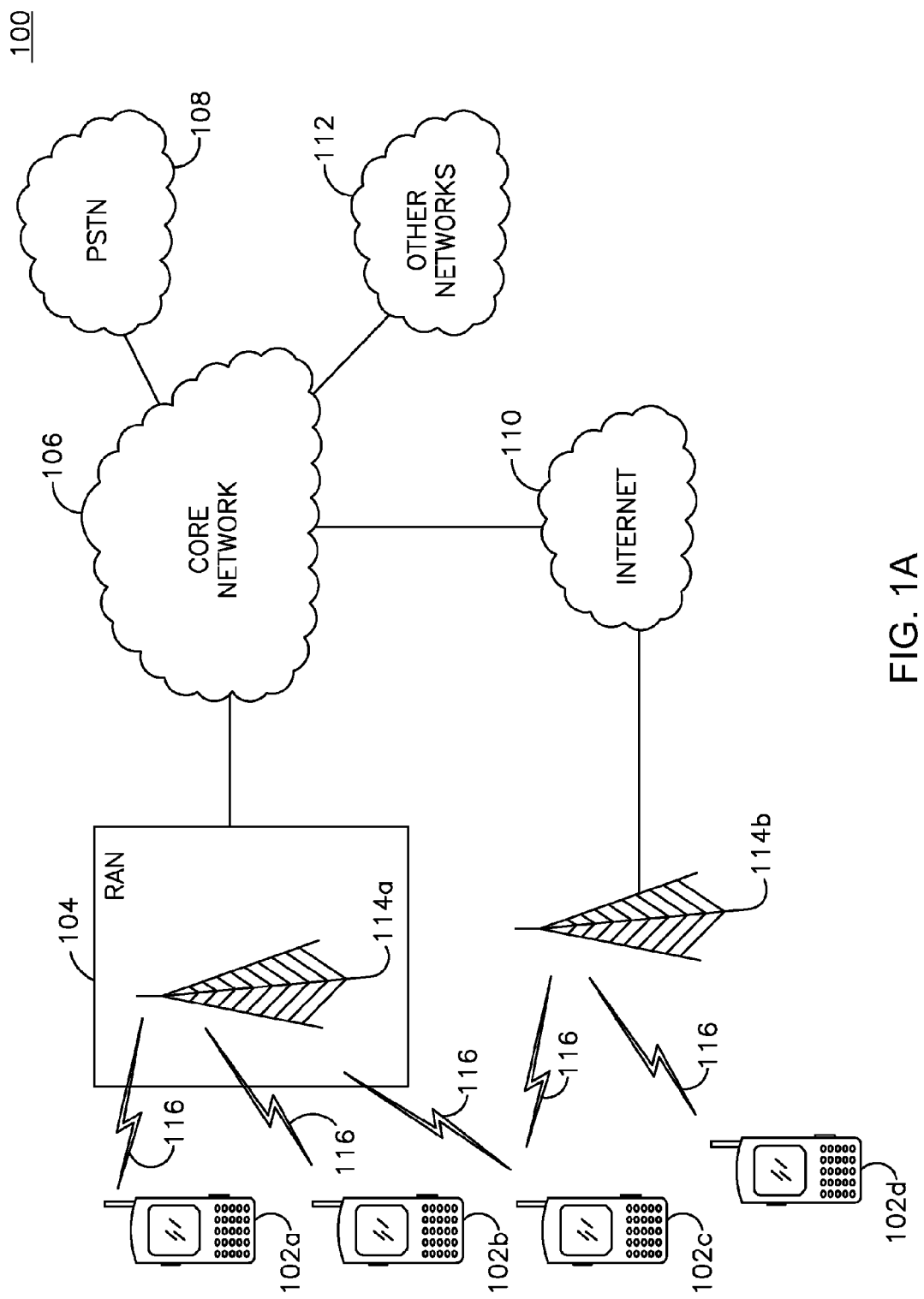
FIG. 1A shows an example communications system in which one or more disclosed embodiments may be implemented.

FIG. 1A shows an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an evolved Node-B (eNB), a home Node-B (HNB), a home eNB (HeNB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link, (e.g., radio frequency (RF), microwave, infrared (IR), ultraviolet (UV), visible light, and the like). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as universal mobile telecommunications system (UMTS) terrestrial radio access (UTRA), which may establish the air interface 116 using wideband CDMA (WCDMA). WCDMA may include communication protocols such as high-speed packet access (HSPA) and/or evolved HSPA (HSPA+). HSPA may include high-speed downlink packet access (HSDPA) and/or high-speed uplink packet access (HSUPA).

In another embodiment, the base station 114a and the WTRUs 102a, 102b, 102c may implement a radio technology such as evolved UTRA (E-UTRA), which may establish the air interface 116 using long term evolution (LTE) and/or LTE-advanced (LTE-A).

In other embodiments, the base station 114a and the WTRUs 102a, 102b, 102c may implement radio technologies such as IEEE 802.16 (i.e., worldwide interoperability for microwave access (WiMAX)), CDMA2000, CDMA2000 1x, CDMA2000 evolution-data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), GSM/EDGE RAN (GERAN), and the like.

The base station 114b in FIG. 1A may be a wireless router, HNB, HeNB, or AP, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT, (e.g., WCDMA, CDMA2000, GSM, LTE, LTE-A, and the like), to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over Internet protocol (VoIP) services to one or more of the WTRUs 102a, 102b, 102c, 102d. For example, the core network 106 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114*b*, which may employ an IEEE 802 radio technology.

Figure 1B:
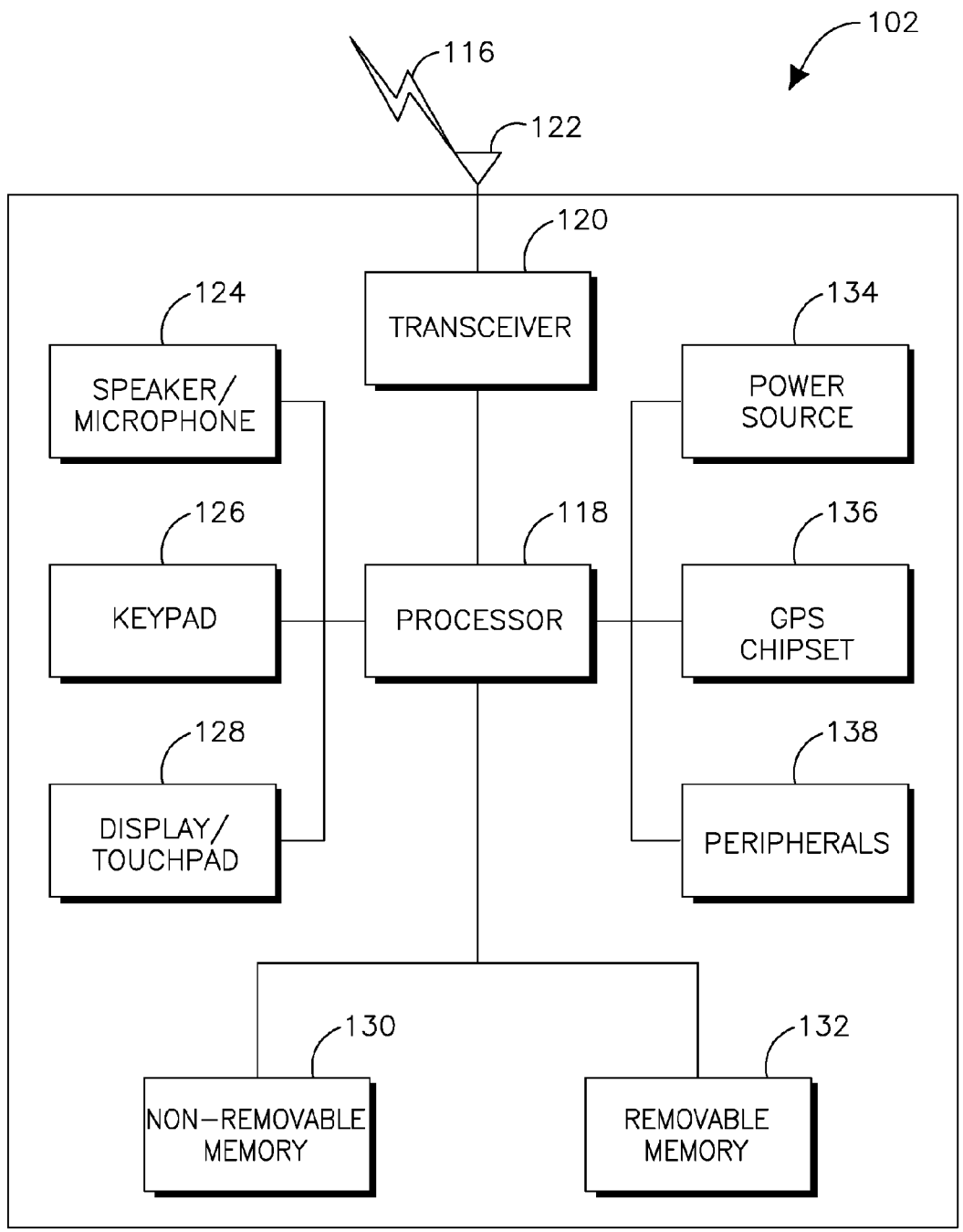
FIG. 1B shows an example wireless transmit/receive unit (WTRU) that may be used within the communications system shown in FIG. 1A.

FIG. 1B shows an example WTRU 102 that may be used within the communications system 100 shown in FIG. 1A. As shown in FIG. 1B, the WTRU 102 may include a processor 118, a transceiver 120, a transmit/receive element, (e.g., an antenna), 122, a speaker/microphone 124, a keypad 126, a display/touchpad 128, a non-removable memory 130, a removable memory 132, a power source 134, a global positioning system (GPS) chipset 136, and peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. The transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122, (e.g., multiple antennas), for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station, (e.g., base stations 114*a*, 114*b*), and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
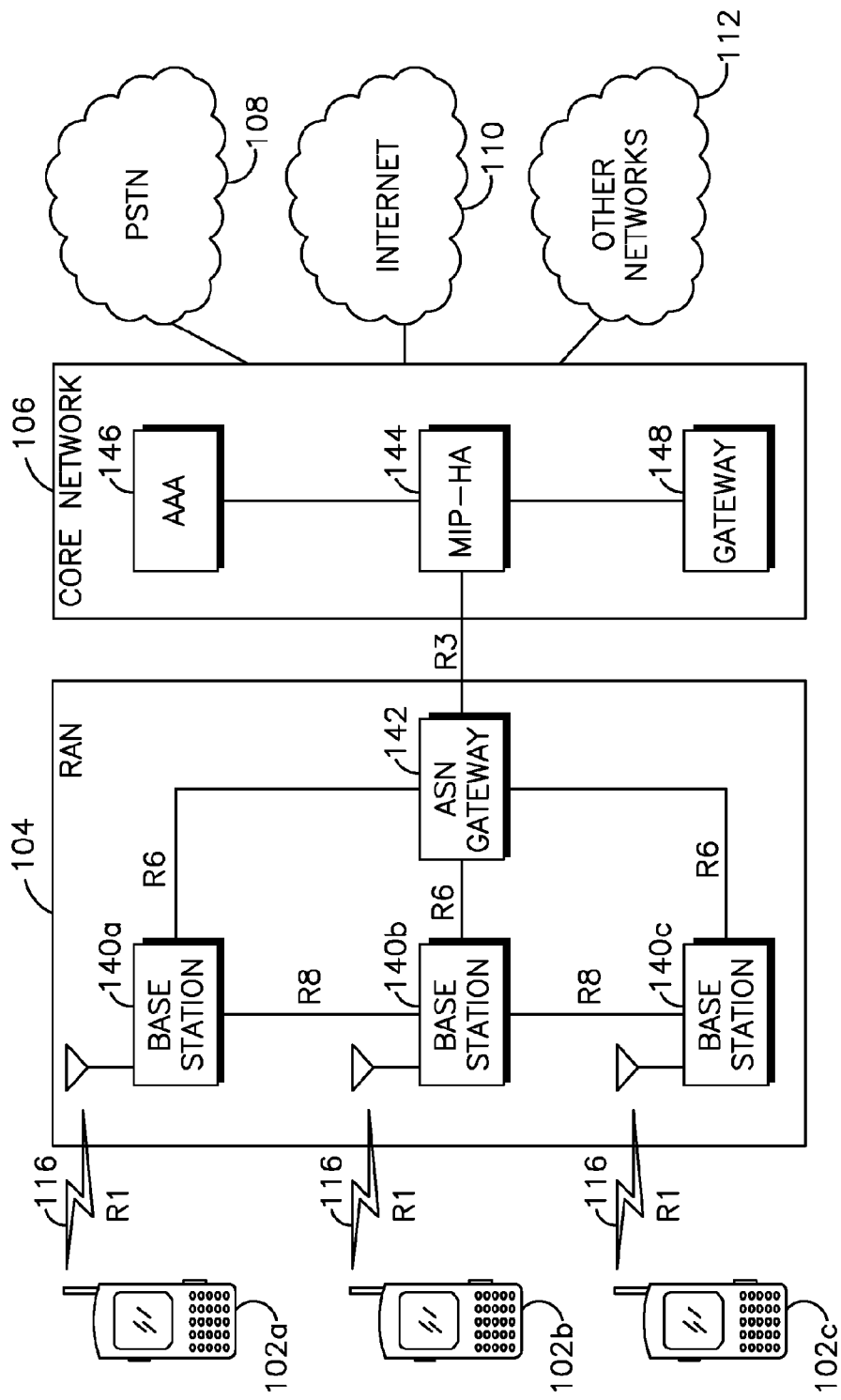
FIG. 1C shows an example radio access network and an example core network that may be used within the communications system shown in FIG. 1A.

FIG. 1C shows an example RAN 104 and an example core network 106 that may be used within the communications system 100 shown in FIG. 1A. The RAN 104 may be an access service network (ASN) that employs IEEE 802.16 radio technology to communicate with the WTRUs 102*a*, 102*b*, 102*c* over the air interface 116.

As shown in FIG. 1C, the RAN 104 may include base stations 140*a*, 140*b*, 140*c*, and an ASN gateway 142, though it will be appreciated that the RAN 104 may include any number of base stations and ASN gateways while remaining consistent with an embodiment. The base stations 140*a*, 140*b*, 140*c* may each be associated with a particular cell (not shown) in the RAN 104 and may each include one or more transceivers for communicating with the WTRUs 102*a*, 102*b*, 102*c* over the air interface 116. In one embodiment, the base stations 140*a*, 140*b*, 140*c* may implement MIMO technology. Thus, the base station 140*a*, for example, may use multiple antennas to transmit wireless signals to, and receive wireless signals from, the WTRU 102*a*. The base stations 140*a*, 140*b*, 140*c* may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102a, 102b, 102c and the RAN 104 may implement the IEEE 802.16 specification. In addition, each of the WTRUs 102a, 102b, 102c may establish a logical interface (not shown) with the core network 106. The logical interface between the WTRUs 102a, 102b, 102c and the core network 106 may be used for authentication, authorization, IP host configuration management, and/or mobility management.

The communication link between each of the base stations 140a, 140b, 140c may include protocols for facilitating WTRU handovers and the transfer of data between base stations. The communication link between the base stations 140a, 140b, 140c and the ASN gateway 142 may include protocols for facilitating mobility management based on mobility events associated with each of the WTRUs 102a, 102b, 102c.

As shown in FIG. 1C, the RAN 104 may be connected to the core network 106. The communication link between the RAN 104 and the core network 106 may include protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA 144 may be responsible for IP address management, and may enable the WTRUs 102a, 102b, 102c to roam between different ASNs and/or different core networks. The MIP-HA 144 may provide the WTRUs 102a, 102b, 102c with access to packet-switched networks, such as the Internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional land-line communications devices. In addition, the gateway 148 may provide the WTRUs 102a, 102b, 102c with access to the networks 112, which may include other wired or wireless networks that are owned and/or operated by other service providers.

Although not shown in FIG. 1C, it will be appreciated that the RAN 104 may be connected to other ASNs and the core network 106 may be connected to other core networks. The communication link between the RAN 104 and the other ASNs may include protocols for coordinating the mobility of the WTRUs 102a, 102b, 102c between the RAN 104 and the other ASNs. The communication link between the core network 106 and the other core networks may include protocols for facilitating interworking between home core networks and visited core networks.

Media presentation synchronization across multiple devices is required in certain third generation partnership project (3GPP) packet switch stream (PSS) and multimedia broadcast/multicast services (MBMS) for improved user quality of experience. This feature may not be available in the existing 3GPP mobile networks. In particular, existing 3GPP specifications may lack solutions to enable media synchronization between various Internet protocol (IP) multimedia subsystem (IMS) devices participating in interactive multimedia sessions.

There are several use cases related to the new feature of media synchronization for 3GPP mobile networks. In one use case, (i.e., use case 1), PSS and MBMS service synchronization may be implemented among many users. A service provider may desire to provide a live soccer event using PSS or MBMS service that may potentially be accessed by many users. For example, a first user may access the PSS or MBMS service in a bus with a first wireless transmit/receive unit (WTRU), such as a tablet personal computer (PC), and a second user sitting across from the first user may watch the same game on a second WTRU. A goal is scored and both users, despite watching on different screens, celebrate this event at the same time. In general, people who follow the game should observe the scenes synchronously and celebrate at the same time when a goal is scored, despite watching on different screens.

In another use case, (i.e., use case 2), lip-sync may occur between media sub-streams. For example, a first user may use PSS or MBMS service to watch a live soccer game. The first user may listen to the audio of the soccer game using a headphone that is connected to the first user's WTRU. The first WTRU receives and plays out the audio stream. To obtain a better video quality, the first user uses another device connected to a big display to receive and play out the video stream of the soccer game. Lip-sync between the audio and video may be required for good quality of experience across different devices. There are no existing mechanisms in the 3GPP PSS or MBMS services for a user service to be presented synchronously on multiple WTRUs or for the sub-streams, (e.g., audio and video), to be presented synchronously when the sub-streams are played back on different WTRUs.

In yet another use case, (i.e., use case 3), PSS and MBMS service synchronization may be implemented after media transfer. For example, a first user may watch a movie on a WTRU in a car. A second user may wants to watch the movie with the first user. The first user may replicate the session on the second user's WTRU using an inter-WTRU session transfer feature provided by the first user's service provider. The movie may be simultaneously shown on the WTRUs of the first and second users as a result of inter-WTRU session transfer replication.

Furthermore, the first user may watch the movie in English and the second user may watch the same movie in Spanish on their respective WTRUs. In this use case, it may be desirable that the media presentation is synchronized across the WTRUs of both users so that they can watch the same scenes and discuss the movie. This may create a requirement for multi-device synchronization. However it is also possible that the users don't want to synchronize the media presentations on their tablet PCs, and that instead they each just watch the show individually. The preference of multi-device synchronization may be selected at the session setup or at the inter-WTRU session transfer/replication procedure.

In another example, the first user may want to watch the video from a device connected to a big display and listen to the corresponding audio with a headphone connected to the first user's WTRU. Only the video stream in a multimedia service may be transferred to a big display from a WTRU, but the audio stream may still be played out on the WTRU. Alternatively, the first user may watch the video on a WTRU and listen to the corresponding audio from a sound system. The audio and video may be required to be synchronized across different devices in such a collaborative session. Loss of synchronization may occur between the audio and video if the multi-device synchronization is not addressed. However, when the media session is replicated from one WTRU to another WTRU, there is no existing mechanism for a media session to be presented synchronously on the two WTRUs, or for the sub-streams of a multimedia service, (e.g., audio and video), to be presented synchronously as the sub-streams are played back on different WTRUs. Further, there is no mechanism for the WTRUs to determine whether they synchronously present a replicated media session or not.

Various devices may be implemented to create a synchronization group to achieve media synchronization among the devices.

Figure 2:
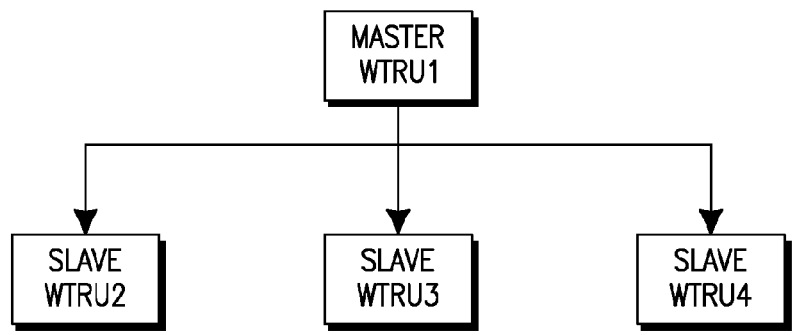
FIG. 2 shows an example of master-slave synchronization.

One example of a group synchronization scheme is the master-slave receiver scheme shown in FIG. 2. In the master-slave receiver scheme, receivers are classified into a master receiver and slave receivers. None of the slave receivers may send any feedback information about the timing of the playout processes. Instead, the playout timing is adjusted to that of the master receiver. Only the master receiver (WTRU1) sends (multicast) its playout timing to all of the other (slave) receivers (WTRU2, WTRU3 and WTRU4). FIG. 2 illustrates such a tree shape scheme, where WTRU1 is the root of the tree and all of the other WTRUs are the children. The traffic goes from WTRU1 to other WTRUs without any feedback channel. This solution may be suitable for a group synchronization that involves a large number of WTRUs during a broadcast session, where RTCP packets from receivers are not possible.

Figure 3:
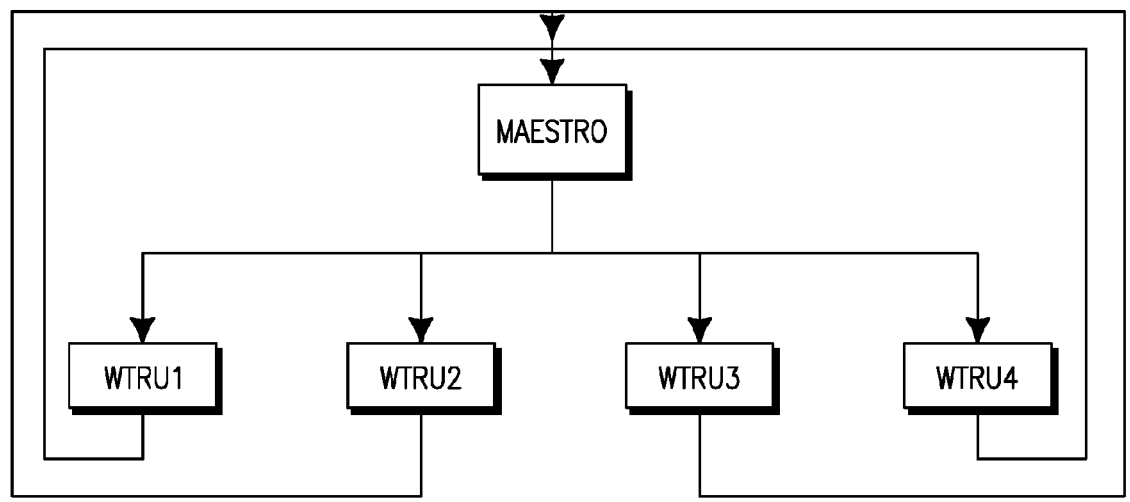
FIG. 3 shows an example of a synchronization maestro.

Another example of a group synchronization scheme is the synchronization maestro scheme shown in FIG. 3. This scheme is based on the existence of a synchronization maestro, which gathers playout data from all of the receivers (WTRU1, WTRU2, WTRU3 and WTRU4) and corrects the playout timing among the receivers. In order to do this, each receiver may send (unicast) the information to the maestro, and the maestro may send (multicast) the corrected playout timing. This scheme may be used by telecommunications and Internet converged services and protocols for advanced networks (TISPAN) for Internet protocol television (IPTV) cross device synchronization. The RTCP protocol may be extended to carry the current presentation time stamps from receivers to the maestro, as well as new commands from the maestro to adjust the presentation time stamps in the receivers. A special case of this scheme may be achieved by electing one of the WTRU to be the maestro.

Figure 4:
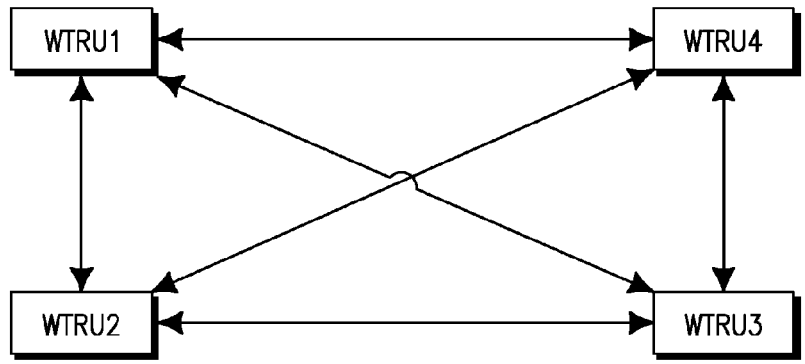
FIG. 4 shows an example of distributed control synchronization.

Another example of a group synchronization scheme is the distributed control synchronization scheme shown in FIG. 4. In the distributed control scheme, all the receivers may exchange (multicast) the control packets or use timestamps in media packets to calculate playout delays to achieve group synchronization. Each receiver may decide the reference playout timing from among the output timing of itself and that of the other receivers. The distributed control scheme may adaptively keep the temporal and causal relationships according to the network load under distributed control. FIG. 4 illustrates such a fully connected graph between WTRUs. This solution may be suitable for a group synchronization that involves a small number of WTRUs in a social network, such as Facebook or Google+.

Media synchronization for dynamic adaptive streaming over hypertext transfer protocol (HTTP) (DASH) may be used for adaptive HTTP streaming, whereby presentation time fields in media presentation descriptors (MPD) may be used to adjust timeliness of various media segments. Thus, it may be the responsibility of an HTTP streaming server or other proxy server that provides MPD data to adjust presentation time to guarantee the synchronous playout of media streams. The multi-device synchronization for live video streaming may be achieved by using "suggestedPresentationDelay" at the MPD level, which may be set by the HTTP streaming server. The MPD may carry quality of experience (QoE) configuration parameters that include "initial playout delay". Thus, there may be a feedback channel between DASH clients and reporting servers, (which may be the same HTTP streaming server), to send "initial playout delay" data. For lengthy HTTP streaming, clock drift, (i.e., a difference in clock accuracy of an encoder and decoder), may cause the playback to lag behind real-time or to interrupt temporarily. HTTP streaming severs may help in solving this clock drift by including the producer reference time box 'prft' in some media segments, which may carry the mapping between the decode time stamp and media time stamp with reference to a coordinated universal time (UTC) wall-clock.

Described herein are methods and apparatus used to achieve rich multimedia experience in IMS devices that require an interactive and synchronous playout service. In order to implement the media synchronization between various IMS devices (use case 1 and 2), new specifications to the signaling protocols are proposed. In particular, real time streaming protocol (RTSP) may be used to achieve the media synchronization with a new interface between IMS devices and IMS core network components. Also, a pure session initiation protocol (SIP) solution may be implemented that may treat the media synchronization as an IMS service that may be discovery and used through the IMS core network. To enable the implementation of a distributed solution to the media synchronization, a presence server may be utilized between IMS WTRUs to provide the means to replay and broadcast messages without impacting other IMS components. In addition, synchronized playout may be implemented for the case of PSS streaming session transfer, (use case 3, described above), using a bookmarking service.

In a first server based solution used to solve use case 1 and use case 2, a synchronization server may be deployed inside or outside IMS and may be contacted by a PSS proxy, an HTTP proxy, or a broadcast multicast service center (BM-SC). All clients may send playout status messages to a synchronization server and receive a command for adjusting playout timing. For the protocol, for PSS proxy, RTSP may be used along with GET_PARAMETER, SET_PARAMETER, and suggestedPresentationOffset as "a" attribute in a session description protocol (SDP). For an HTTP proxy, REST HTTP put/get may be used.

In a second server based solution used to solve use case 1and use case 2, a synchronization server is an IMS application server (IMS AS), which may be controlled (e.g., redirected) by a service selection function (SSF) or serving call session control function S-CSCF of an IMS core network (IMS CN). For the protocol, an SIP method may be used along with INVITE (with SDP), SUBSCRIBE (to join), PUBLISH (new synchronization group), INVITE/REFER (other WTRUs to synchronization group), SUBSCRIBE (to join), PUBLISH (new synchronization group), INVITE/REFER (other WTRUs to synchronization group), and the like.

For either of the two server based solutions presented above, control may be delegated such that clients may send presentation/display delays and join/leave synchronization groups. The server may send suggested presentation delay, and status info, such as reaction to out of synch (e.g., drop, stretch). The second server may be discovery/deployed as part of an IMS network.

In a first client based solution used to solve cases 1, and 3, clients may send messages directly to each other, and may be used with master-slave or distributed cases. A protocol may be communicated using a presence server. Control may be delegated such that create/join/leave synchronization groups, clients PUBLISH: presentation/display delays, server NOTIFY: suggested presentation delay, and status info: reaction to out of synch: drop, stretch.

In a first client based solution used to solve use cases 1, 2 and 3, a PSS session transfer may be implemented using the Bookmark "suggestedPresentationOffset". A protocol may be established to communicate using a Bookmark service, and control may be implemented by an extend XML schema.

Figure 5:
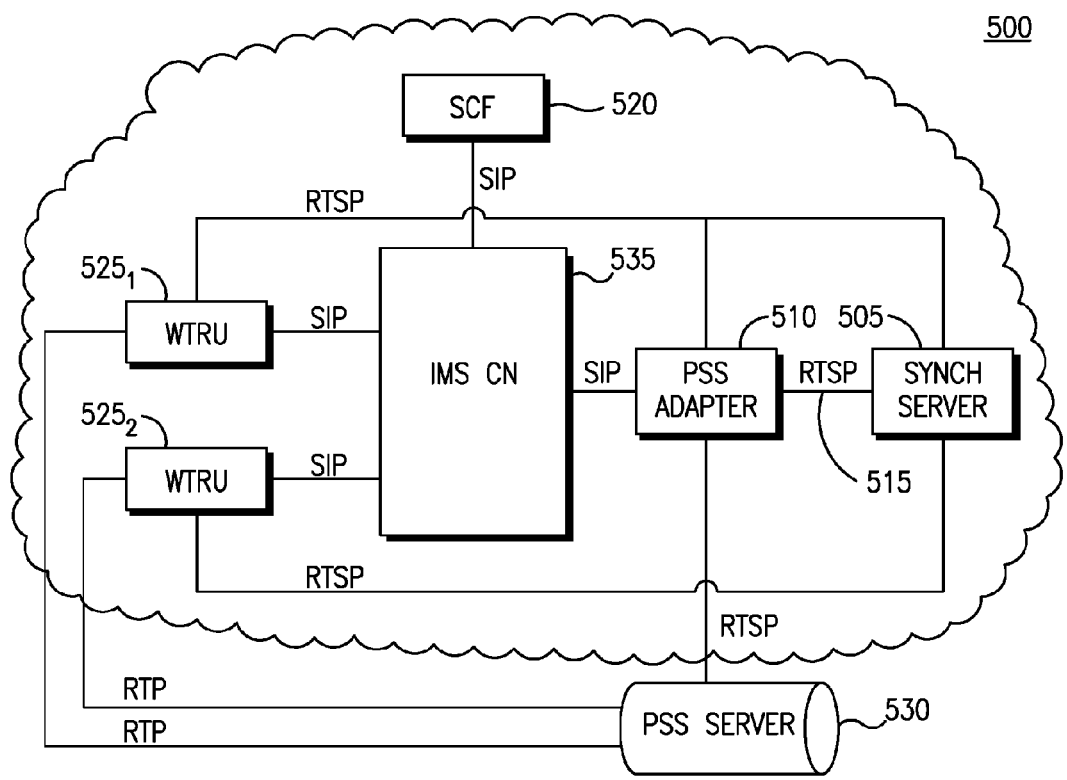
FIG. 5 shows an example system architecture with a dedicated synchronization server inside an Internet protocol (IP) multimedia subsystem (IMS)

FIG. 5 shows an example system architecture 500 with a dedicated synchronization server 505 of an Internet protocol (IP) multimedia subsystem (IMS). The dedicated synchronization server 505 may be contacted by a PSS adaptor 510 (or HTTP adaptor) using an RTSP (or HTTP) protocol 515. The functionality of the synchronization server 505 may be deployed within a service control function (SCF) 520, the PSS adapter 510, an HTTP adaptor (not shown), or a BM-SC for MBMS and PSS services (not shown). Alternatively, a plurality of WTRUs 5251 and 5252 may be organized into a single synchronization group. If a WTRU 525 is interested to join the only available synchronization group, it may do so by following the messages received from the synchronization server 505. The system architecture 500 also includes a PSS server 530 and an IMS CN 535. The IMS CN 535 may contain the control components to establish IMS sessions and provision certain quality parameters between WTRUs. The PSS server 530 may contain several multimedia contents that may be streamed to WTRUs during an IMS session. The PSS adaptor 510 may be used to translate between the SIP protocol used by WTRUs and an RTSP protocol used by the PSS server 530.

Figure 6:
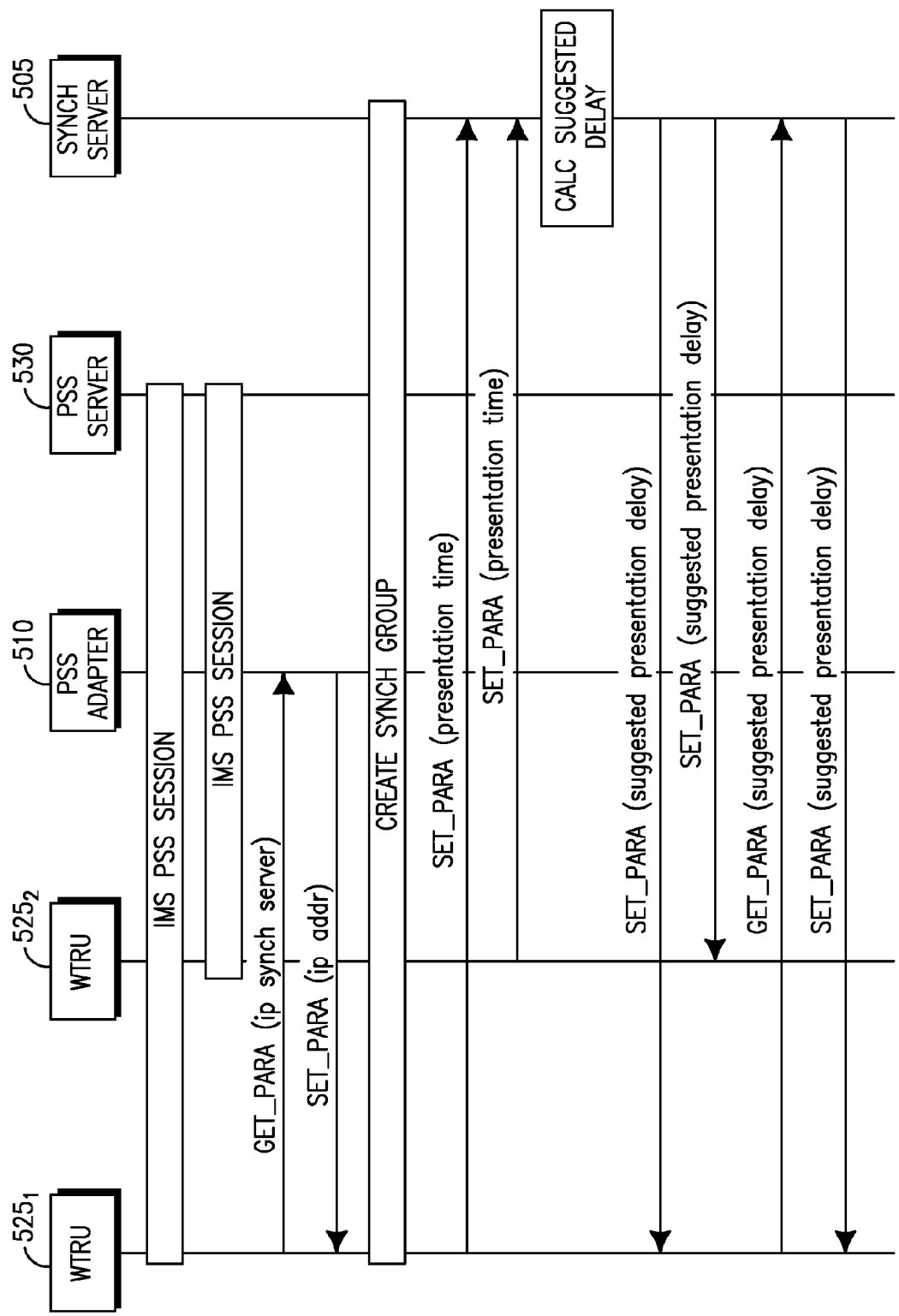
FIG. 6 shows an example sample message sequence with the synchronization server of FIG. 5.

FIG. 6 shows an example sample message sequence with the synchronization server 505 of FIG. 5. A sample of messages may be exchanged between the synchronization server 505 and WTRU 5251 to create a synchronization group with the WTRU 5252. Initially, RTSP GET_PARAMETER may be sent from the WTRUs 525 to the PSS adapter 510 to retrieve the IP address of the synchronization server 505, if the WTRUs 525 do not know that IP address. RTSP SET_PARAMETER may be used by the WTRUs 525 to send their presentation delay to the synchronization server 505. Alternatively, the WTRUs 525 may send the presentation delay by embedding it using an "a" attribute within an SDP offer, referred to as suggestedPresentationOffset. When the synchronization server 505 receives all of the required presentation delays from the WTRUs 525, it may issue a RTSP SET_PARAMETER command to all WTRUs to set the suggested presentation delay. Alternatively, the synchronization server 505 may send the presentation delay by embedding it using an "a" attribute within the SDP answer, referred to as suggestedPresentationOffset. In addition, a WTRU 525 may query the synchronization server 505 about the suggested presentation delay using RTSP GET_PARAMETER.

Figure 7:
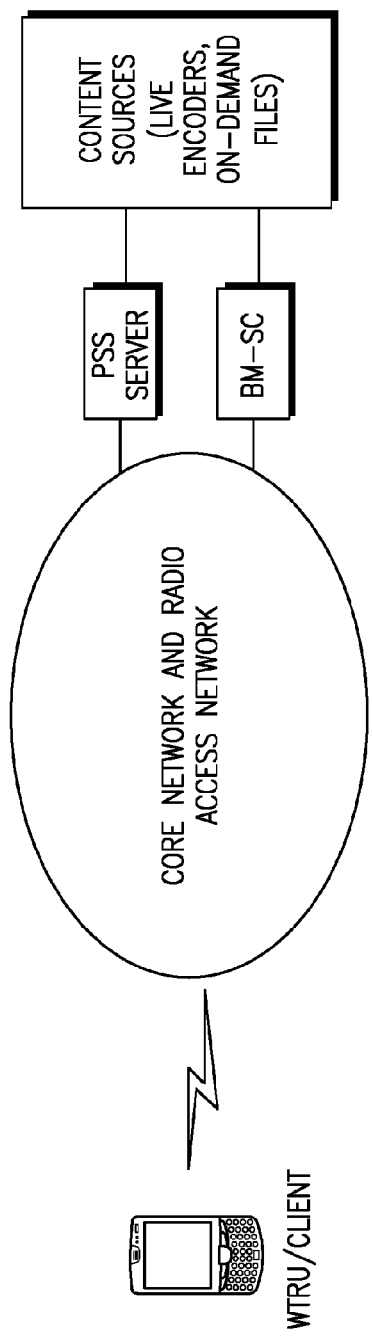
FIG. 7 shows an example of a non-IMS packet switch streaming (PSS)/multimedia broadcast/multicast service (MBMS) user service architecture.

FIG. 7 shows an example of a non-IMS packet switch streaming (PSS)/multimedia broadcast/multicast service (MBMS) user service architecture. The MBMS service provider/network operator may announce the list of available MBMS user services and user service bundles, along with information about the user services, to the WTRUs. In order for a user to be able to initiate a particular service, the WTRU may need to obtain certain metadata information. In order for this information to be available to the WTRU, network operators/service providers may use different service discovery mechanisms. A user service announcement may be performed over an MBMS bearer or over point-to-point push bearers, using HTTP and other interactive transport methods, or via other means. The user service announcement may contain SDP and access related parameters. A suggestedPresentationOffset may be sent to the WTRUs in the user service announcement. For example, the SDP may include an a=suggestedPresentationOffset:value line, besides other parameters. The value of suggestedPresentationOffset may provide a mapping of the presentation time of a data unit to the wall-clock time to enable synchronized playout of the WTRUs adhering to the same rule.

Figure 8:
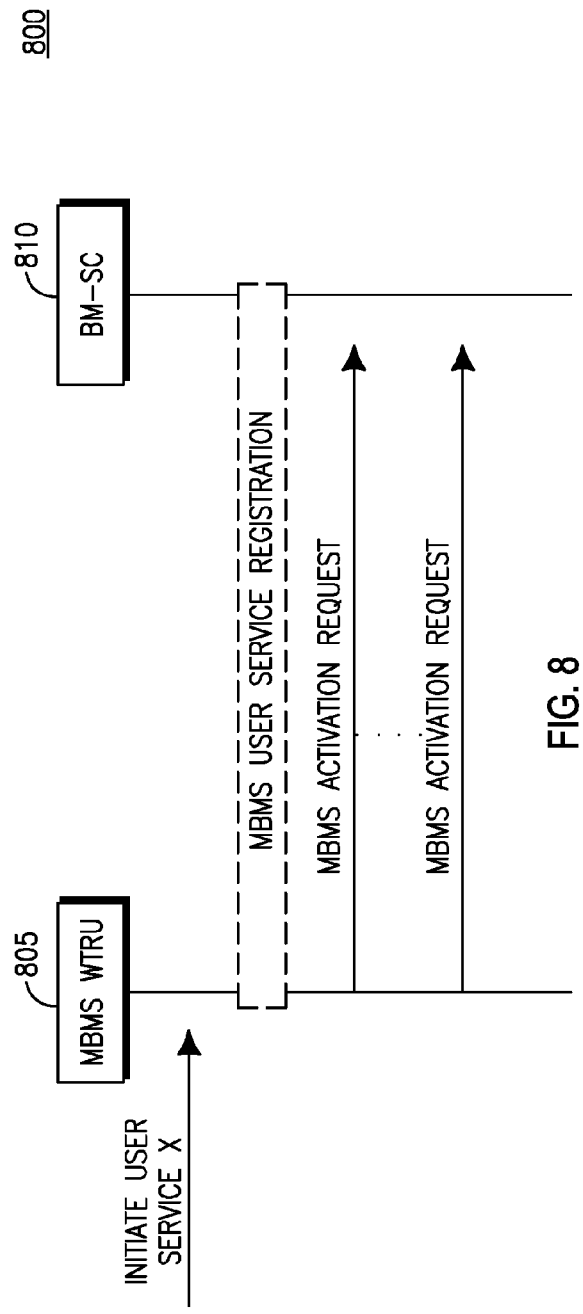
FIG. 8 shows an example flow diagram of the initiation of an MBMS user service.

FIG. 8 shows an example flow diagram of a procedure 800 for initiating an MBMS user service. A WTRU 805 may perform MBMS user service initiation to set-up the reception of MBMS user service data. The MBMS user service initiation procedure 800 may take place after the discovery of the MBMS user service. The WTRU 805 may include its suggestedPresentationOffset information in a message sent to a BM-SC 810, which indicates the value that this WTRU desires for the suggestedPresentationOffset. The value may be set to be the expected end-to-end delay for this WTRU. The BM-SC 810 may use the values of suggestedPresentationOffset from one or more WTRUs to determine the value of the suggestedPresentationOffset in the response that it sends to the WTRUs. Subsequently, suggestedPresentationOffset information may be sent to the WTRU 805 by the BM-SC 810 at user service initiation. The value of suggestedPresentationOffset may provide a mapping of the presentation time of a data unit to the wall-clock time to enable synchronized playout of the WTRUs adhering to the same rule.

If the WTRU 805 receives the suggestedPresentationOffset information from the BM-SC 810 (or the server), it may play out the media for this session according to the suggestedPresentationOffset information in order to have synchronized playout with other WTRUs adhering to the same rule. Specifically, the value of suggestedPresentationOffset may specify a delay offset from the time when the first octet of a data unit was generated at the sender that is suggested to be used for presentation of the first octet of the data unit. For a received RTP packet, if the wall-clock time corresponding to the RTP timestamp carried in the RTP packet is T, a WTRU may present the data contained in the first octet of the associated RTP packet to the user at T+ suggestedPresentationOffset in terms of the wall-clock time if synchronized playout with other WTRUs adhering to the same rule is desired.

Figure 9:
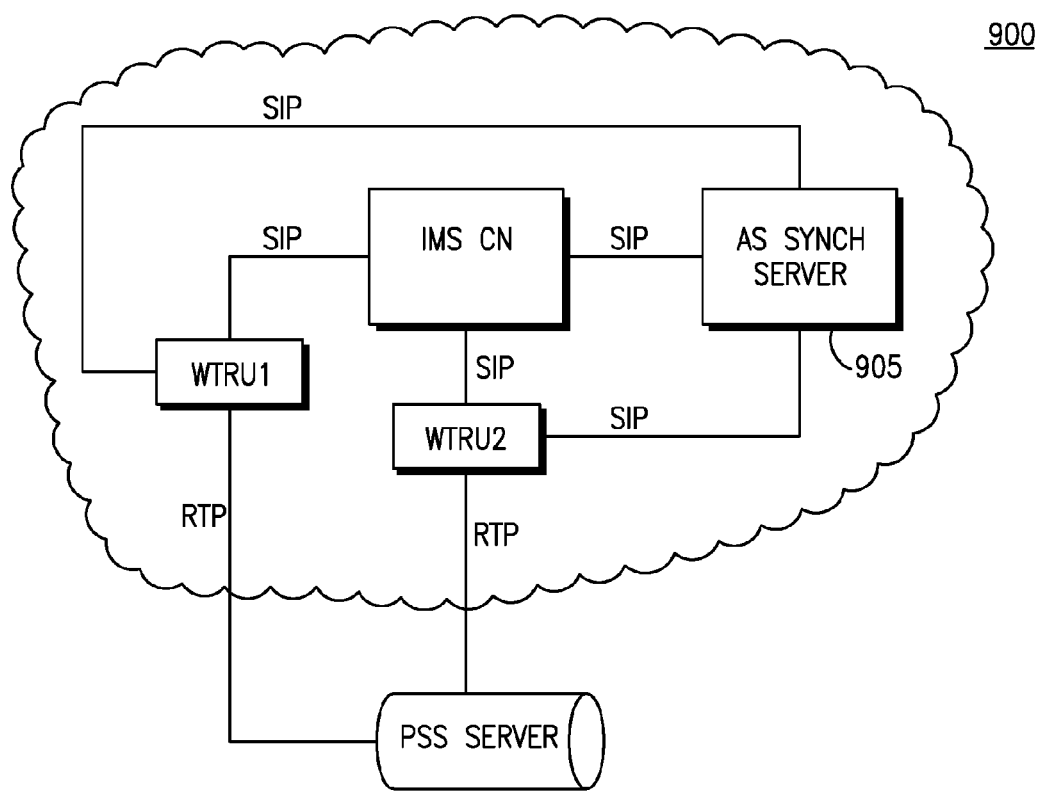
FIG. 9 shows an example architecture with a synchronization server as an IMS application server (AS)

FIG. 9 shows an example system architecture 900 with a synchronization server 905 as an IMS application server (AS). The IMS AS synchronization server 905 may be contacted directly by the WTRUs using the SIP protocol. The discovery of the existence of a server may be achieved using service (SRV) records of domain name system (DNS) queries, or may be sent out of band to interested WTRUs. Initially, WTRU1 may have an IMS PSS or MBMS streaming session. Later on, WTRU2 may create an interactive session, where video streams are synchronized between WTRU1 and WTRU2.

Figure 10:
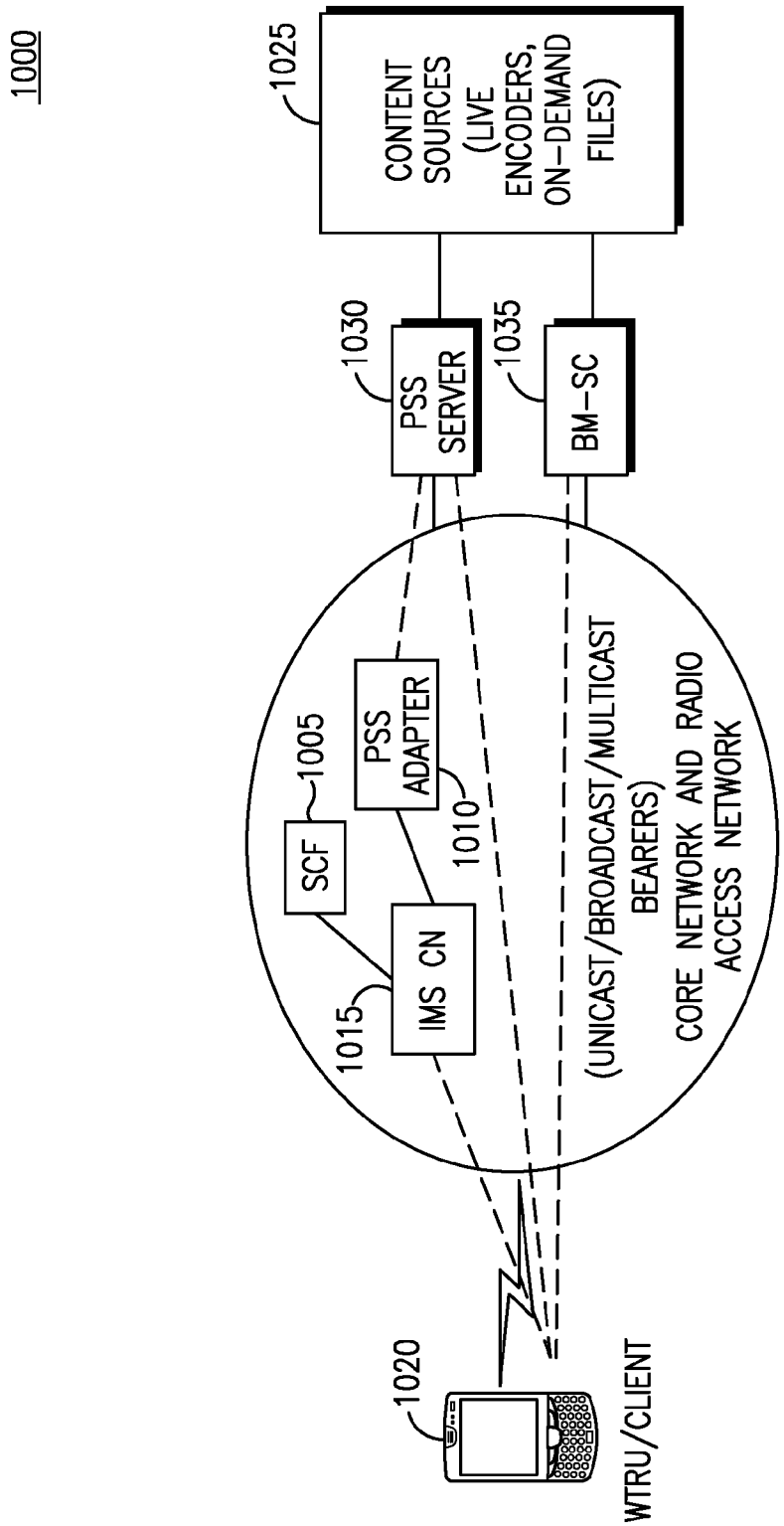
FIG. 10 shows an example of an IMS-based PSS/MBMS user service architecture.

FIG. 10 shows an example of an IMS-based PSS/MBMS user service architecture 1000. The server functionality may be deployed within an SCF 1005 or a PSS adapter 1010 via an IMS CN 1015 to support MBMS and PSS services in a core network and radio access network via unicast/broadcast/multicast bearers. A WTRU/client 1020 may access content sources 1025, (e.g., live encoders, on-demand files) via a PSS server 1030 or a BM-SC 1035.

Figure 11:
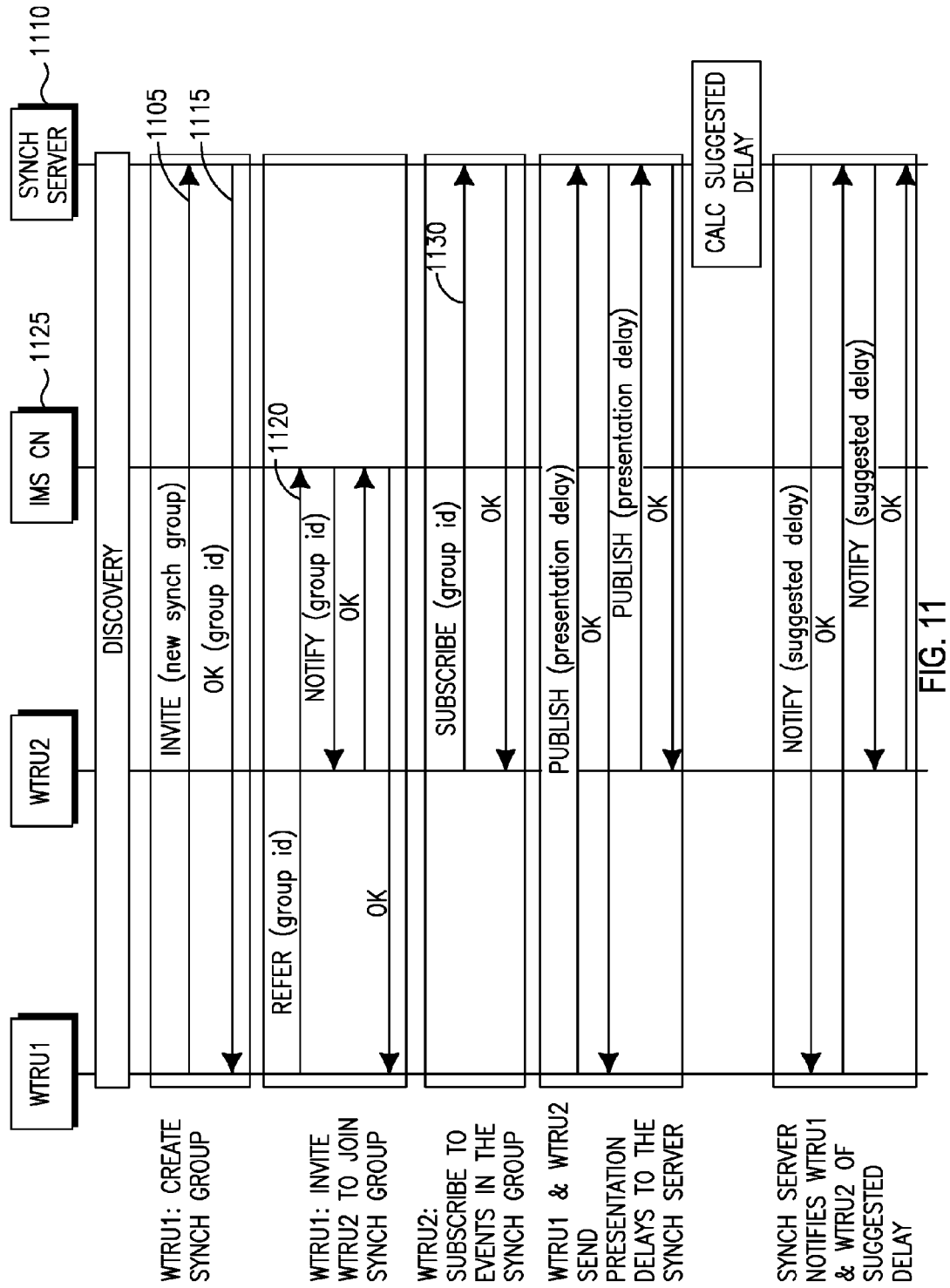
FIG. 11 shows an example sample message sequence with an IMS synchronization server.

FIG. 11 shows an example sample message sequence with an IMS synchronization server, whereby a sequence of messages exchanged between IMS server and WTRUs may create a synchronization group, as well as enable a user ti subscribe to events in this group. Initially, a WTRU1 may create a group by sending an INVITE message 1105 to the synchronization server 1110. The successful creation of this group may be signaled by receiving an OK message 1115 with the associated group identification (ID). Alternatively, WTRUs may be organized into a single synchronization group. Subsequently, the WTRU1 may invite other WTRUs to join this group ID by sending a REFER message 1120 to an IMS CN 1125. An acceptance message may be communicated between WTRUs. The WTRU2 may send a SUBSCRIBE message 1130 to the synchronization server 1110 to receive events related to this group ID. Afterward, all WTRUs may send their presentation delays to the synchronization server 1110 using a PUBLISH method. WTRUs may send their presentation delays by using an SIP INVITE message including an extra "a" attribute within the SDP offer. Calculating the suggested presentation delay may take place at the synchronization server and NOTIFY messages may be sent to the WTRU to allow for the synchronized playout between these WTRUs in this group ID. The synchronization server 1110 may send the suggested presentation delays by using an SIP OK message including an extra "a" attribute within the SDP answer.

Figure 12:
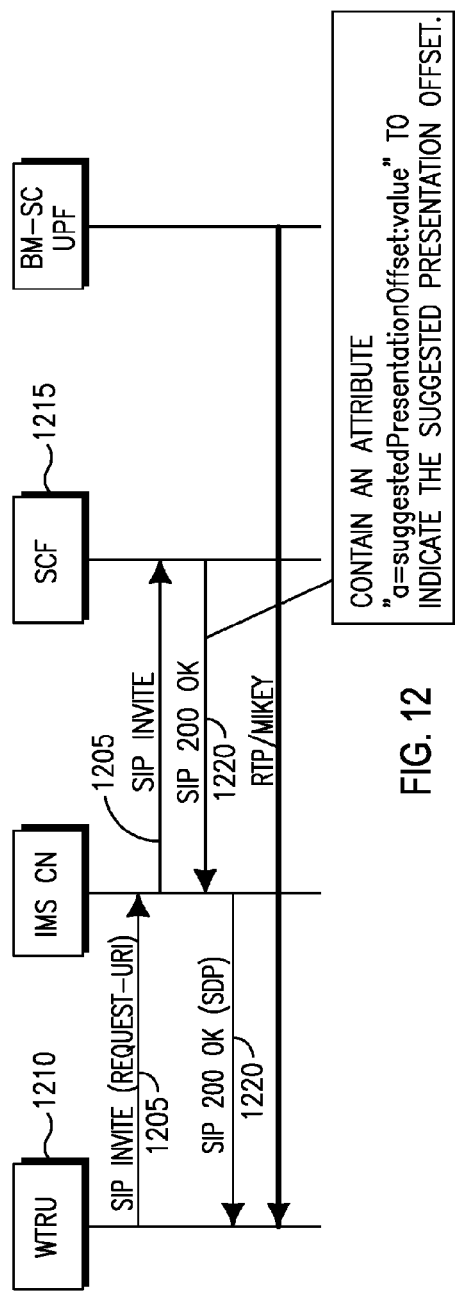
FIG. 12 shows an example of an MBMS streaming session initiation.

FIG. 12 shows an example of an MBMS streaming session initiation. Upon receipt of an SIP INVITE request 1205 from a WTRU 1210, an SCF may process the SIP INVITE request 1205, including performing service authorization procedures and examining the parameters in the SDP offer by the WTRU 1210. If the SIP INVITE request 1205 from the WTRU is successfully handled, the SCF 1215 may answer the WTRU 1210 with a SIP 200 OK message. The SIP 200 OK message 1220 may contain a session description (SDP) answer. The SDP answer may include an α=suggestedPresentationOffset:value line, besides other parameters. The value of suggestedPresentationOffset may provide a mapping of the presentation time of each data unit to the wall-clock time to enable synchronized playout of the WTRUs adhering to the same rule.

Once a WTRU receives the SIP response, the WTRU may examine the media parameters in the received SDP. The received SDP may contain an α=suggestedPresentationOffset:value line. The value of suggestedPresentationOffset specifies a delay offset from the time when the first octet of a data unit was generated at the sender that is suggested to be used for presentation of the first octet of the data unit. For a received RTP packet, if the wall-clock time corresponding to the RTP timestamp carried in the RTP packet is T, a WTRU may present the data contained in the first octet of the associated RTP packet to the user at T+suggestedPresentationOffset in terms of the wall-clock time if synchronized playout with other WTRUs adhering to the same rule is desired.

If a WTRU does not want to have the synchronized playout with other WTRUs, it does not have to follow the suggestedPresentationOffset. It is possible for a WTRU to present data behind the suggested presentation time, (if its network conditions are unsatisfactory and its latency is large). The consequence is that media presentation on the WTRUs may not be synchronized in MBMS. Non-synchronized playback may provide an unsatisfactory user experience.

The initial SIP INVITE request 1205 includes an SDP offer. The SDP offer may include an a=suggestedPresentationOffset:value line to indicate the value that the WTRU 1210 desires for the suggestedPresentationOffset. The value here may be set to be the expected end-to-end delay for this WTRU. The SCF 1215 may use the values of suggestedPresentationOffset in the SDP offers from one or more WTRUs to determine the value of the suggestedPresentationOffset in its SDP answer sent in the SIP 200 OK response 1220.

Figure 13:
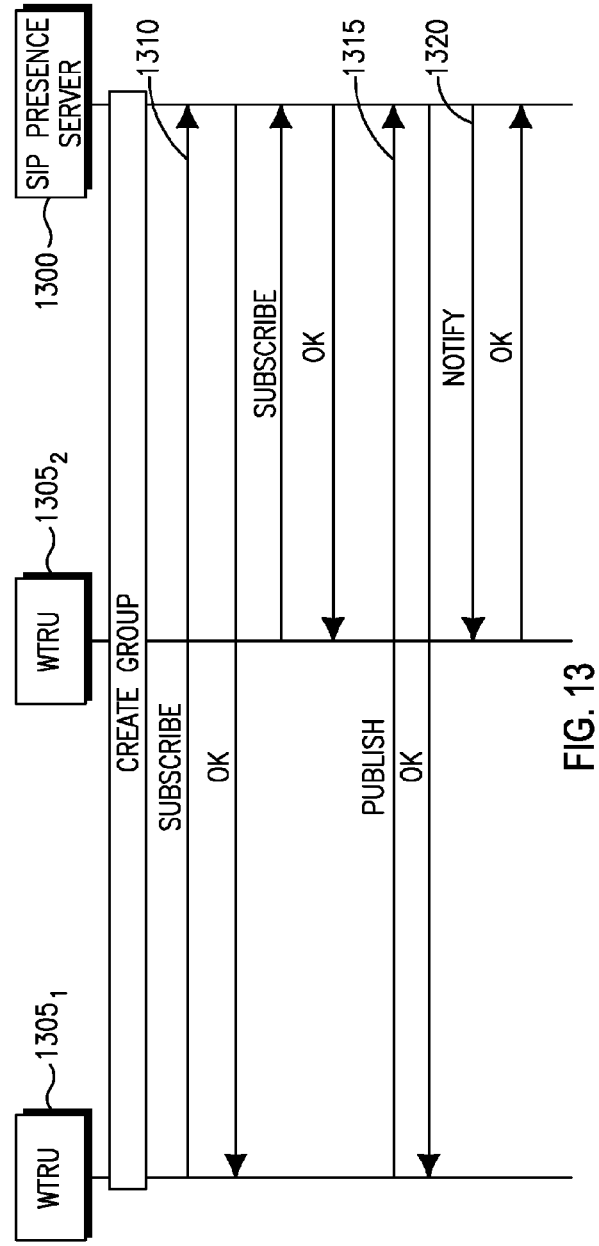
FIG. 13 shows an example message sequence for using a presence server for synchronization.

FIG. 13 shows an example message sequence for using a SIP presence server 1300 for synchronization. The SIP presence server 1300 may be used to achieve group synchronization using a distributed architecture, where a plurality of WTRUs $1305_1$ and $1305_2$ may send their presentation delays to each other. Also, the SIP presence server 1300 may implement master-slave group synchronization, where one of the WTRUs 1305 is elected to be the master and the other WTRUs are slave receivers of notification messages from the master WTRU.

FIG. 13 shows a synchronization group created between the WTRUs $1305_1$ and $1305_2$ using the SIP presence server 1300. A SUBSCRIBE message 1310 may be used to express interest to receive other WTRU presentation delays. The WTRUs 1305 may be organized into a single synchronization group, and therefore a SUBSCRIBE message 1310 may not be necessary. If a WTRU 1305 desires to send its presentation delay, it may accomplish this by sending a PUBLISH message 1315 to the SIP presence server 1300. Alternatively, WTRUs may send their presentation delays to other WTRUs by using a SIP INVITE message, with a special "a" attribute within an SDP offer. Subsequently, the presence server 1300 may send, (i.e., broadcast), a NOTIFY message 1320 to all interested WTRUs. A master WTRU may send the suggested presentation delays by using a SIP OK message including an extra "a" attribute within the broadcasted SDP answer.

Inter-WTRU session transfer may be is used for the transfer or replication of an ongoing PSS session from a transferor WTRU $1305_1$ to a transferee WTRU $1305_2$. A media session may be replicated from one WTRU to another WTRU. Inter-WTRU session transfer and replication for media service may be accomplished using a bookmark. The WTRU $1305_1$ may include "suggestedPresentationOffset" in the bookmark if a synchronized playout of media session is needed. The bookmark may be retrieved by other WTRUs and used to start play back the media with the same delay in all WTRUs participating in the inter-WTRU session transfer. For example, if WTRU $1305_2$ desires to have synchronized media playout with WTRU $1305_1$, it may use the "suggestedPresentationOffset" information in the bookmark to obtain the playout point. Either push or pull mode may be used in the inter-WTRU session transfer. In the push mode, the session transfer may be initiated by transferor WTRU $1305_1$. In the pull mode, the session transfer is initiated by transferee WTRU $1305_2$.

Figure 14:
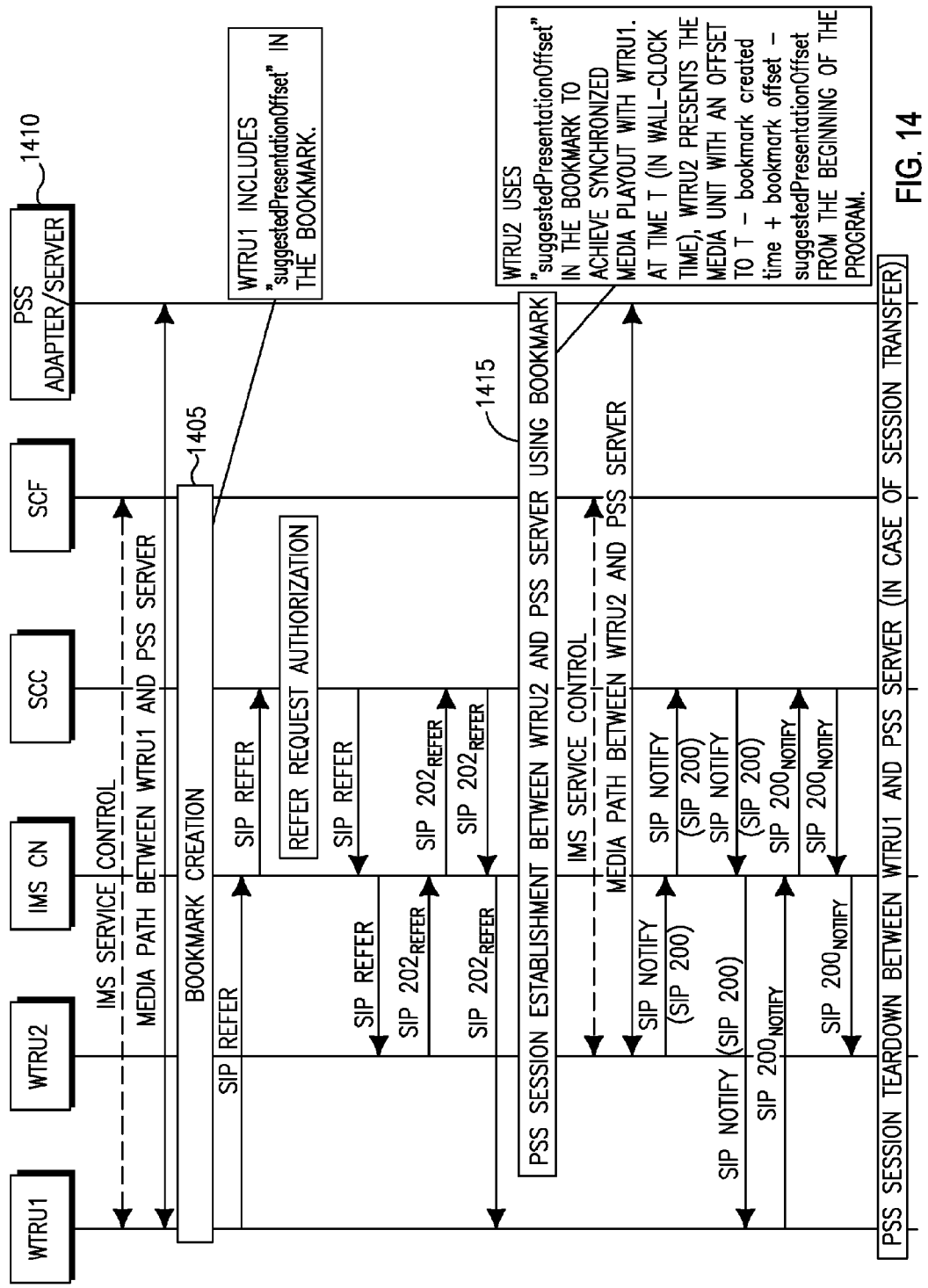
FIG. 14 shows a flow diagram of an inter-wireless transmit/receive unit (WTRU) session transfer (push mode)

FIG. 14 shows a flow diagram of an inter-WTRU session transfer (push mode). FIG. 14 shows the information flow of session transfer and replication from WTRU1 to WTRU2 in push mode. The WTRU-1 may initiate the networked bookmark (nBookmark) procedure (1405). In order to obtain synchronized playout with WTRU2, WTRU1 may include "suggestedPresentationOffset" in the bookmark, which specifies an offset in time from the bookmark created time to the bookmark presentation time at WTRU1. If WTRU1 does not desire to have the synchronized media playout with WTRU2, it does not have to include "suggestedPresentationOffset" in the bookmark.

The bookmark may be used to establish the PSS session between WTRU-2 and a PSS server 1410 (1415). In order to obtain synchronized media playout with WTRU-1, when the media session is replicated on WTRU2, at time T (in the wall-clock time), WTRU-2 may present the media unit with an offset equal to T−bookmarkcreated time+bookmark offset−suggestedPresentationOffset from the beginning of the program. If WTRU2 does not want to have the synchronized media playout with WTRU1, it does not have to use the "suggestedPresentationOffset" information in the bookmark to obtain the playout point.

Figure 15:
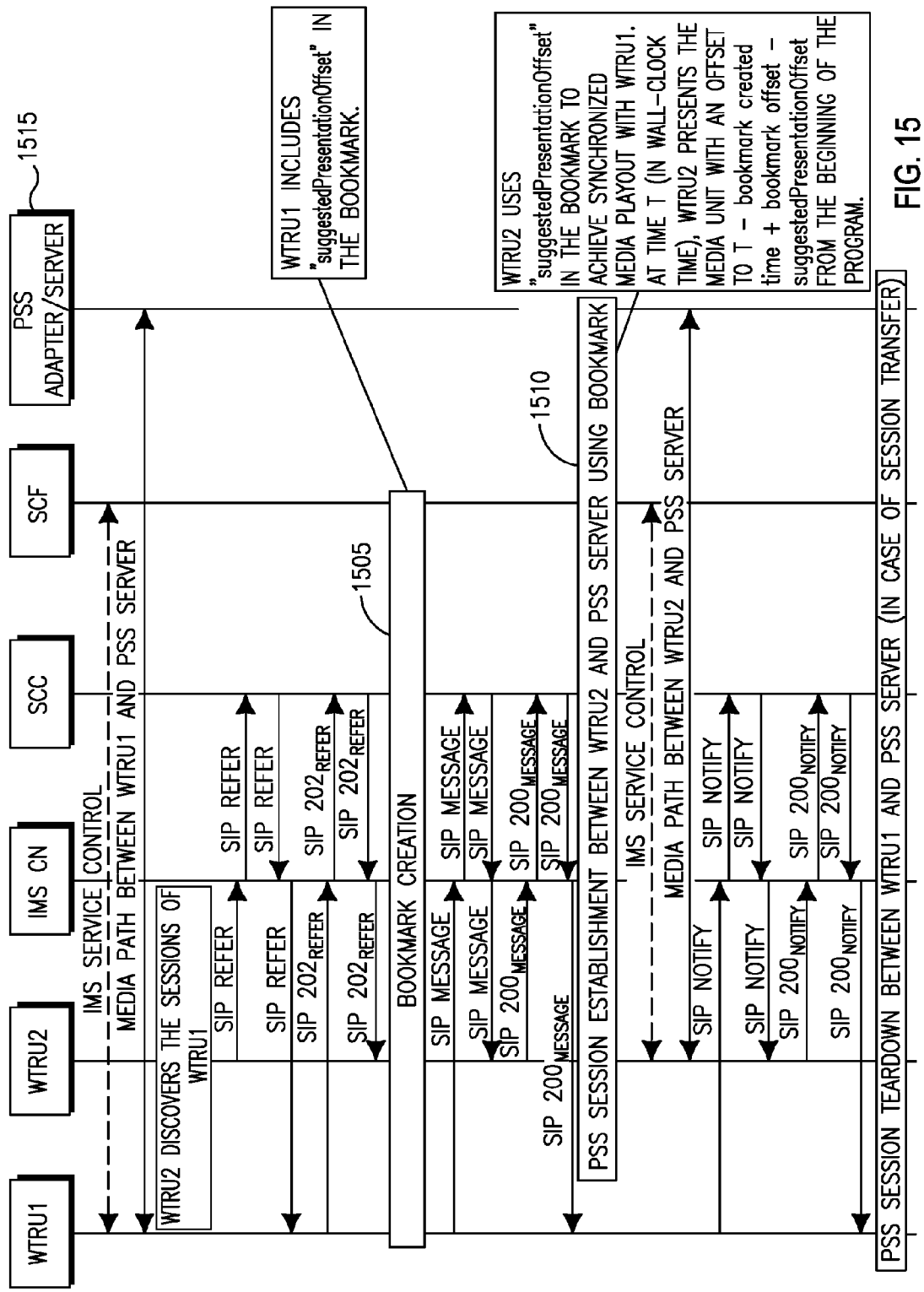
FIG. 15 shows a flow diagram of an inter-WTRU session transfer (pull mode)

FIG. 15 shows a flow diagram of an inter-WTRU session transfer (pull mode). At 1505, WTRU1 may initiate a networked bookmark procedure. In order to obtain synchronized playout with WTRU2, WTRU1 may include "suggestedPresentationOffset" in the bookmark, which specifies an offset in time from the bookmark created time to the bookmark presentation time at WTRU1. If WTRU1 does not want to have the synchronized media playout with WTRU2, it does not have to include "suggestedPresentationOffset" in the bookmark. At 1510, the bookmark may be used to establish the PSS session between WTRU2 and a PSS server 1515. In order to obtain synchronized media playout with WTRU1, when the media session is replicated on WTRU2, at time T (in the wall-clock time), WTRU2 may present the media unit with an offset equal to T−bookmarkcreated time+bookmark offset−suggestedPresentationOffset from the beginning of the program.

FIGS. 16A and 16B show a modified extensible markup language (XML) schema for a networked bookmark, which includes the suggestedPresentationOffset element.

FIG. 17 shows an extended XML schema for an nBookmark that includes a suggestedPresentationOffset element. The schema file name, as referenced in the main nBookmark schema, is 3gpp-bookmark-2012.xsd.

The schemaVersion schema defines two elements, schemaVersion and delimiter. The value of the schemaVersion is used in the main nBookmark schemas above. The value of the schemaVersion element and version attribute may be set to 2 in this release of the main nBookmark schema and increased by 1 in every future release where new element(s) or attribute(s) are added. The delimiter element may be used in the main nBookmark schema to avoid a schema validation error, (due to the unique particle attribution rule). The delimiter element may be set to a value of 0, and the element content may be ignored by the receiving device. The file name used for this schema is schema-version.xsd.

When a device receives an instantiation of the nBookmark compliant to this schema, it determines the schema version required to parse the instantiation. For example, if the device supports one or more versions of the nBookmark schema with the schema version attribute, then it may use the schema that has the highest schema version attribute value that is equal to or less than the value in the received schemaVersion element.

FIG. 18 shows a schemaVersion element, as described above, having a syntax list including the following parameters:

Creator: Represents the user who creates the bookmark, it shall be in the format of IMPU.

Created: Represents the time when the bookmark is created.

ProgramId: represents the ID of the bookmarked program, which shall be globalContentID retrieved from User Service Description.

ProgramType: represents the type of delivery for the selected program. It can be "pss" or "mbms".

Offset: Represents the bookmark time, in the format of an offset from the beginning of the program.

Comment: Represents any comment chosen by the user.

Tag: Represents any categorization chosen by the user.

Rank: Represents the user favorite rating for the bookmark.

Sharing: If set, the bookmark can be shared with others.

SuggestedPresentationOffset: the offset in time from the bookmark created time to the bookmark presentation time at a WTRU.

Retrieval count: may be set to 0 and incremented by the service provider when the bookmark is retrieved.

Expires: Represents the expire time of current bookmark.

Id: Represents the identifier of current bookmark.

Although features and elements are described above in particular combinations, one of ordinary skill in the art will appreciate that each feature or element may be used alone or in combination with any of the other features and elements. In addition, the embodiments described herein may be implemented in a computer program, software, or firmware incorporated in a computer-readable medium for execution by a computer or processor. Examples of computer-readable media include electronic signals, (transmitted over wired or wireless connections), and computer-readable storage media. Examples of computer-readable storage media include, but are not limited to, a read only memory (ROM), a random access memory (RAM), a register, a cache memory, a semiconductor memory device, a magnetic media, (e.g., an internal hard disc or a removable disc), a magneto-optical media, and an optical media such as a compact disc (CD) or a digital versatile disc (DVD). A processor in association with software may be used to implement a radio frequency transceiver for use in a WTRU, UE, terminal, base station, Node-B, eNB, HNB, HeNB, AP, RNC, wireless router or any host computer.

The invention claimed is:

1. A method comprising: a first wireless transmit/receive unit (WTRU) creating a networked bookmark for a media program at a bookmark-created time; the first WTRU presenting the media program at a bookmark-presentation time, wherein the first WTRU includes in the networked bookmark a suggested presentation offset that indicates an offset in time from the bookmark-created time to the bookmark-presentation time; and the first WTRU transmitting the networked bookmark, including the suggested presentation offset, to an Internet Protocol (IP) Multimedia Subsystem (IMS) network for use by a second WTRU in replicating, at the second WTRU, the presentation of the media program at the first WTRU.

2. The method of claim 1, wherein: the networked bookmark further comprises an identification of the media program, the bookmark-created time, and a first offset; and the first offset indicates an offset in time from a beginning of the media program.

3. The method of claim 2, wherein the first offset corresponds to a current playout position of the media program at the first WTRU at the bookmark-created time.

4. The method of claim 1, wherein the first WTRU creates and transmits the networked bookmark as part of a bookmark procedure initiated by the first WTRU.

5. The method of claim 1, wherein the media program corresponds to a packet-switched streaming (PSS) session.

6. The method of claim 1, wherein the media program corresponds to a multimedia broadcast/multimedia service (MBMS) session.

7. The method of claim 1, wherein replicating, at the second WTRU, the presentation of the media program at the first WTRU comprises the second WTRU determining a second-WTRU-presentation offset based at least in part on the suggested presentation offset, and the second WTRU presenting the media program with the determined second-WTRU-presentation offset from the beginning of the media program.

8. The method of claim 7, wherein determining the second-WTRU-presentation offset based at least in part on the suggested presentation offset comprises determining the second-WTRU-presentation offset based at least in part on the suggested presentation offset, at least in part on a current wall-clock time, at least in part on the bookmark-created time, and at least in part on the first offset.

9. The method of claim 8, wherein determining the second-WTRU-presentation offset based at least in part on the suggested presentation offset, at least in part on a current wall-clock time, at least in part on the bookmark-created time, and at least in part on the first offset comprises: determining the second-WTRU presentation offset to be equal to the current wall-clock time minus the bookmark-created time plus the first offset minus the suggested presentation offset.

10. A first wireless transmit/receive unit (WTRU) configured to synchronize presentation of a media program on a plurality of WTRUs, the plurality of WTRUs including the first WTRU and a second WTRU, the first WTRU comprising: a processor configured to i) present the media program and ii) create a networked bookmark for the media program at a bookmark-created time, wherein the networked bookmark comprises a suggested presentation offset that indicates an offset in time from the bookmark-created time to a bookmark presentation time at the first WTRU; and a transmitter configured to transmit the networked bookmark, including the suggested presentation offset, to an Internet Protocol (IP) Multimedia Subsystem (IMS) network for use by the second WTRU in replicating at the second WTRU the presentation of the media program at the first WTRU.

11. The first WTRU of claim 10, wherein: the networked bookmark further comprises an identification of the media program, the bookmark-created time, and a first offset; and the first offset indicates an offset in time from a beginning of the media program.

12. The first WTRU of claim 11, wherein the first offset corresponds to a current playout position of the media program at the first WTRU at the bookmark-created time.

13. The first WTRU of claim 10, wherein the first WTRU creates and transmits the networked bookmark as part of a bookmark procedure initiated by the first WTRU.

14. The first WTRU of claim 10, wherein the media program corresponds to a packet-switched streaming (PSS) session.

15. The first WTRU of claim 10, wherein the media program corresponds to a multimedia broadcast/multimedia service (MBMS) session.

16. A method comprising: a first wireless transmit/receive unit (WTRU) creating a networked bookmark for a media program at a bookmark-created time; the first WTRU presenting the media program at a bookmark-presentation time, wherein: the first WTRU includes in the networked bookmark a suggested presentation offset, an identification of the media program, the bookmark-created time, and a first offset; the suggested presentation offset indicates an offset in time from the bookmark-created time to the bookmark-presentation time; and the first offset indicates an offset in time from a beginning of the media program; and the first WTRU transmitting the networked bookmark, including the suggested presentation offset, to an Internet Protocol (IP) Multimedia Subsystem (IMS) network, for use by a second WTRU in replicating, at the second WTRU, the presentation of the media program at the first WTRU.

17. The method of claim 16, wherein the first offset corresponds to a current playout position of the media program at the first WTRU at the bookmark-created time.

18. The method of claim 16, wherein the first WTRU creates and transmits the networked bookmark as part of a bookmark procedure initiated by the first WTRU.

19. The method of claim 16, wherein the media program corresponds to a packet-switched streaming (PSS) session.

20. The method of claim 16, wherein the media program corresponds to a multimedia broadcast/multimedia service (MBMS) session.

* * * * *